United States Patent
Coochesfahani

(10) Patent No.: US 8,556,283 B2
(45) Date of Patent: Oct. 15, 2013

(54) SLIDING STEP WITH ADDITIONAL FOLDING STEP

(75) Inventor: Abbas Rasekhi Coochesfahani, Kassel (DE)

(73) Assignee: Gebr. Bode GmbH & Co KG (DE)

( * ) Notice: Subject to any disclaimer, the term of this patent is extended or adjusted under 35 U.S.C. 154(b) by 209 days.

(21) Appl. No.: 12/949,157

(22) Filed: Nov. 18, 2010

(65) Prior Publication Data

US 2011/0133426 A1 Jun. 9, 2011

(30) Foreign Application Priority Data

Dec. 7, 2009 (DE) .................... 20 2009 016 495 U
Apr. 1, 2010 (DE) .................... 20 2010 000 524 U

(51) Int. Cl.
*B60R 3/00* (2006.01)
*B61D 23/00* (2006.01)

(52) U.S. Cl.
USPC ........... 280/166; 280/163; 105/447; 105/448; 105/449

(58) Field of Classification Search
USPC ....................... 280/163, 166; 182/88, 89, 127; 105/443, 447, 448, 449; 52/183
See application file for complete search history.

(56) References Cited

U.S. PATENT DOCUMENTS

| 4,020,920 A | * | 5/1977 | Abbott ............................ 182/19 |
| 4,116,457 A | * | 9/1978 | Nerem et al. .................. 280/166 |
| 4,720,116 A | * | 1/1988 | Williams et al. ............... 280/166 |
| 5,280,934 A | * | 1/1994 | Monte ........................... 280/166 |
| 6,869,092 B1 | * | 3/2005 | Henn ............................ 280/166 |
| 7,168,722 B1 | * | 1/2007 | Piotrowski et al. ............ 280/166 |
| 7,677,584 B2 | * | 3/2010 | Raley et al. ................... 280/166 |
| 7,857,337 B2 | * | 12/2010 | Ferguson et al. ............. 280/166 |
| 2007/0205573 A1 | * | 9/2007 | Hallmark ...................... 280/163 |
| 2007/0221442 A1 | * | 9/2007 | Corne Hans ................... 182/88 |

FOREIGN PATENT DOCUMENTS

| EP | 1916156 A2 | 4/2008 |
| EP | 1923267 A2 | 5/2008 |

* cited by examiner

*Primary Examiner* — J. Allen Shriver, II
*Assistant Examiner* — James M Dolak
(74) *Attorney, Agent, or Firm* — Cantor Colburn LLP

(57) ABSTRACT

Boarding and deboarding apparatus for a vehicle, including a step that can be moved back and forth between a retracted and extended position, which at least in a partially extended position defines a first area that can be stepped upon, lateral guides of the step for attachment to a vehicle, a folding step which is mounted on the step so as to be pivotable between a folded-in and folded-out position and which in a folded-out position defines a second area that can be stepped upon which is parallel to the first area, and blocking means which prevent the folding step from pivoting between the retracted position and an intermediate position of the step, and which release the pivoting of the folding step, at the latest, when the extended position of the step has been reached.

8 Claims, 4 Drawing Sheets

SLIDING STEP WITH ADDITIONAL FOLDING STEP

CROSS-REFERENCE TO RELATED APPLICATIONS

This patent application claims priority to co-pending German Utility Models No. 20 2009 016 495.0 filed Dec. 7, 2009 and No. 20 2010 000 524.8 filed Apr. 1, 2010 which is hereby expressly incorporated by reference in its entirty as part of the present disclosure.

TECHNICAL FIELD

The invention relates to a boarding and deboarding apparatus for a vehicle, in particular for a passenger transport vehicle as it is used in public transport. These boarding and deboarding apparatuses as a rule comprise a step that can be moved back and forth between a retracted and extended position, in the case of a linear displacement a so-called sliding step, which defines an area that can be stepped upon. As a rule, these sliding steps comprise lateral guides of the step for attachment to a car body or vehicle frame of the vehicle. The guides are mounted for example on a housing or frame which in turn is attached to the vehicle.

BACKGROUND

Sliding steps are used in order make it easier for people to board and deboard a passenger transport vehicle by bridging the gap between the vehicle and the platform edge for boarding and deboarding, such as a station platform edge. However, problems arise when the horizontal gap width varies and in particular when, with regard to the vertical direction, the height of the platform edge is not constant, but different from platform to platform. This is the case, for example, in international passenger transportation and national regulations on the height of these platform edges. In EP 1916156 A1, the parallel arrangement of two independently movable sliding steps is proposed in order to solve this problem. However, this is disadvantageous in that the constructional effort and the requirements with regard to the assembly space are comparatively high due to the doubling of the sliding steps. In view of these drawbacks, the inventors of the present invention set themselves the object of finding a solution for the above mentioned problem that is more economical with regard to assembly space and more cost-effective.

BRIEF SUMMARY

The invention provides a boarding and deboarding apparatus of claim 1 and by a passenger transport vehicle of the independent claim. Advantageous embodiments are in each case the subject matter of the dependent claims. It must be remarked that the features cited individually in the patent claims can be combined in any technologically meaningful manner and present other embodiments of the invention. The description, in particular in connection with the figures, additionally characterizes and specifies the invention.

The invention relates to a boarding and deboarding apparatus for a vehicle, in particular for a passenger transport vehicle, for example a public transport vehicle. The boarding and deboarding apparatus according to the invention comprises a step that can be moved back and forth between a retracted and extended position, for example a so-called sliding step, which at least in a partially extended position defines a first area that can be stepped upon. Moreover, lateral guides of the step are provided, for example on its narrow sides, for attachment to a vehicle, for example to the car body. For example, rollers that are guided in rails on the side of the car body are mounted on the step. Moreover, a frame or housing can be provided by means of which the guides are attached to the vehicle. Generic sliding steps are known, for example, from EP 1923267 A1. The invention is not limited with regard to the design of the step, the design of the associated first area that can be stepped upon, and the design of the guide.

According to the invention, a folding step is also provided which is mounted directly on the step and so as to be pivotable between a folded-in and folded-out position. This folding step in the folded-out position defines a second area that can be stepped on and which is disposed parallel to the first area defined by the step. The invention is also not limited with regard to the design thereof, or with regard to the design of the associated second area that can be stepped upon.

According to the invention, blocking means are furthermore provided, which prevent the folding step from pivoting between the retracted position and an intermediate position of the sliding step, and which release the pivoting of the folding step, at the latest, when the extended position of the step has been reached.

Components can be saved and the required assembly space can be reduced by the folding attachment of the folding step to the sliding step. Moreover, due to the fact that, starting from the retracted position, the folding step is not moved in a first travel distance range, it can be determined with comparative ease, by predetermining the travel distance of the sliding step, whether the folding step is folded in or out. For example, this can be carried out by remote control by means of a control element in the interior of the vehicle. Furthermore, a sensor system and electronic evaluation system can be provided, which, for example using an optical or acoustical measurement of the distance to the boarding and deboarding platform, predetermines the travel distance of the sliding step accordingly, and thus determines whether or not the folding step is to be folded out.

Preferably, the folding step is not released until the extended position of the step has been reached. Advantageously, a strict sequence of motion of the step and the folding step can thus be achieved.

In a constructionally simple embodiment, the blocking means comprise at least one control lever mounted on the folding step, and a positive guide of the control lever. The device according to the invention can thus be realized inexpensively and easily.

According to a preferred embodiment, locking means for locking the step in its extended position are furthermore provided, for example a locking lever and an associated actuator. It can thus be ensured, in particular when the folding step is pivoted using a motor, that the step maintains its position and is not moved as well. Preferably, the locking means are designed such that the lock of the step is released when the folding step is pivoted into the folded-in position. A lever mechanism is provided for this purpose.

In a preferred embodiment, the step is mounted so as to be linearly movable back and forth. The assembly space to be provided for the guidance and mounting of the step can thus be dimensioned to be particularly small and the mechanism to be provided therefor can be made comparatively simple.

Even if according to the invention a manual and/or mechanical displacement of the step is conceivable, at least one drive for the motor-actuated movement of the step is preferably provided, for example an electromotive, hydraulic or pneumatic drive. For example, a spindle gear unit is flanged on the drive shaft of the motor. The folding step can be driven by the motor-actuated movement of the step. A separate drive is preferred for pivoting the folding step, for example an electromotive, hydraulic or pneumatic drive.

In order to reduce the construction space, the arrangement of the steps in a preferred embodiment is selected such that, in the folded-in state of the folding step, the step and the folding step can be arranged at a clear width of 110 mm in the vertical direction relative to the areas that can be stepped upon. The clear width in this case is more than the total height defined by the step and the folding step in the folded-in state.

In order to advantageously maintain a parallel orientation of the first and second areas that can be stepped upon during the pivoting movement of the folding step, pivot levers are provided which are arranged and designed so as to form a lever parallelogram.

In order to improve the ease of boarding and in order to be able to bridge a larger horizontal distance to the platform by folding out the folding step, the second area of the folding step that can be stepped upon, in its folded-out state, is offset in the manner of a staircase relative to the first area of the step that can be stepped upon.

Preferably, a control device is provided which is designed such that the extension of the step and the folding of the folding step are carried out in sequence, and that the latter is carried out optionally. Thus, by a control-based predetermination of the traveling distance of the sliding step, it can be determined whether the folding step is folded in or out. For example, the control comprises a remote control by means of a control element in the interior of the vehicle. Furthermore, a sensor system and electronic evaluation system can be provided, which, for example using an optical or acoustical measurement of the distance to the boarding and deboarding platform, predetermines the travel distance of the step accordingly, and thus determines whether or not the folding step is to be folded out.

Moreover, the invention relates to a passenger transport vehicle comprising the advantageous above-mentioned boarding and deboarding apparatus.

The invention as well as the technical environment is explained in more detail with reference to the figures. It must be remarked that the Figures depict two particularly preferred embodiments of the invention, but that it is not limited thereto.

DETAILED DESCRIPTION

Figure 1:
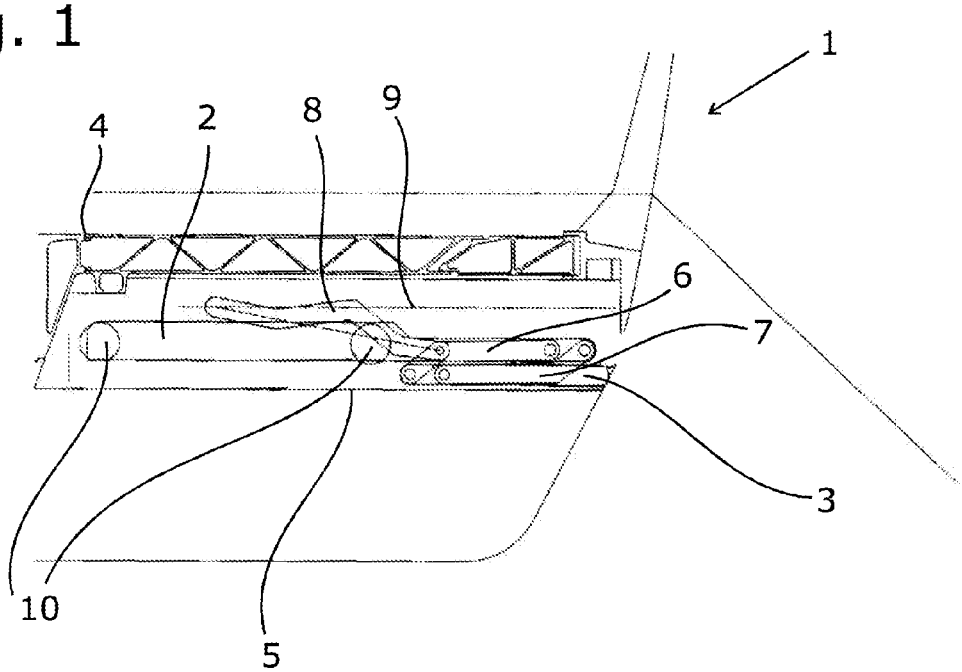
FIG. 1 shows a lateral schematic cross-sectional view of a first embodiment of the boarding and deboarding apparatus according to the invention, wherein the step is in the retracted position.
Figure 2:
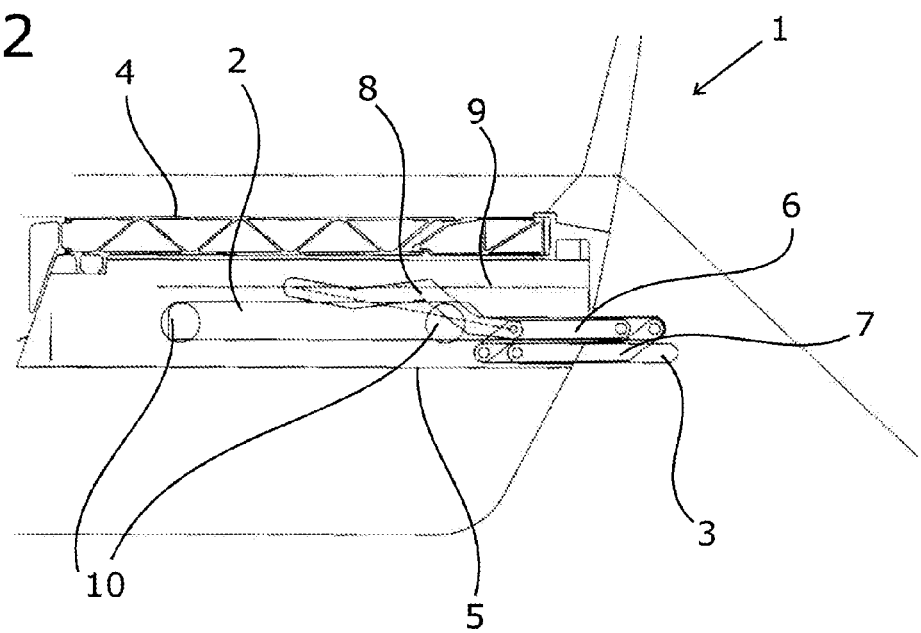
FIG. 2 shows a lateral schematic cross-sectional view of the first embodiment of the boarding and deboarding apparatus according to the invention, wherein the step is in a partially extended position and the folding out of the folding step is blocked.
Figure 3:
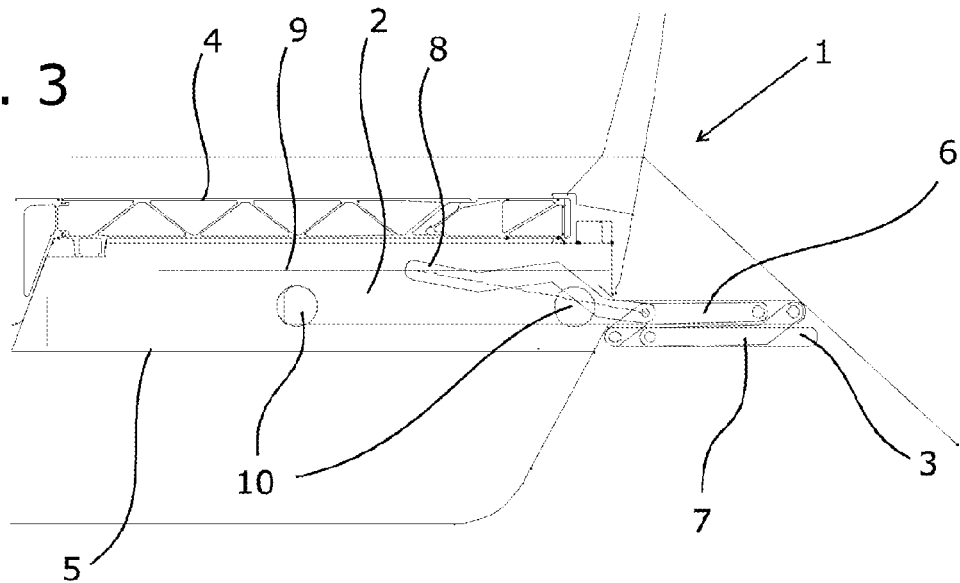
FIG. 3 shows a lateral schematic cross-sectional view of the first embodiment of the boarding and deboarding apparatus according to the invention, wherein the step is in the extended position and the folding out of the folding step is not blocked, but did not take place yet.
Figure 4:
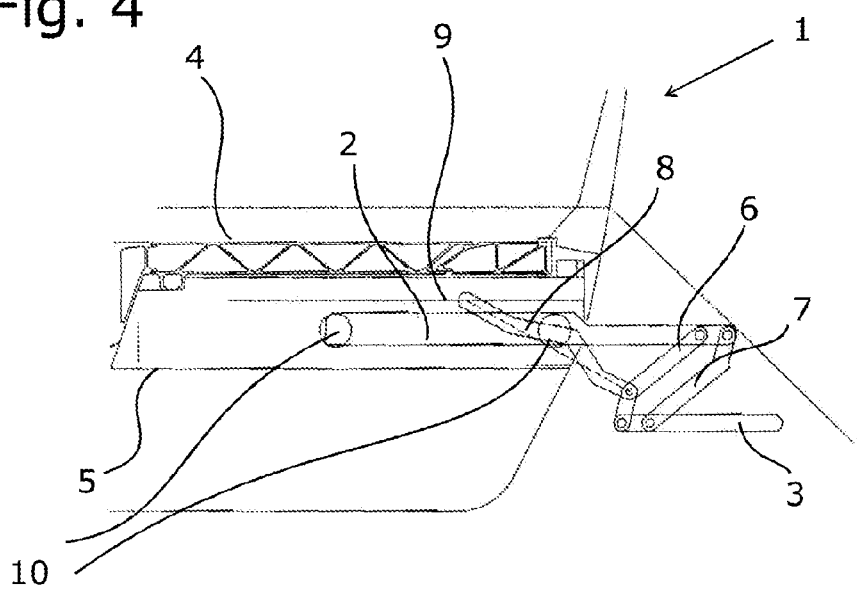
FIG. 4 shows a lateral schematic cross-sectional view of the first embodiment of the boarding and deboarding apparatus according to the invention, wherein the step is in the extended position, and the folding step is in a partially folded-out position.

A first embodiment of the boarding and deboarding apparatus 1 according to the invention shown in FIGS. 1 to 5 comprises a sliding step, i.e. a linearly guided step 2. This step 2 is laterally mounted so as to be movable back and forth by means of rollers 10 accommodated in linearly extending guides that are not shown. These guides are attached in a housing 5, which in turn is attached to a vehicle frame 4 of a passenger transport vehicle. The movement back and forth of the step 2 is caused by a drive that is not shown, for example a so-called spindle drive. The step 2 defines a first area that can be stepped upon. A folding step 3 is pivotably mounted on the step 2, which folding step is shown in FIG. 1 in the folded-in state, i.e. pivoted towards the step 2, and which defines a second area that can be stepped upon. The pivotable mounting is achieved by means of the pivot levers 6 and 7, which are designed and arranged such that a lever parallelogram is formed and a parallel orientation of the first and second areas that can be stepped upon is maintained when the folding step 3 is pivoted. The two pivot levers are cranked. A control lever 8 is hinged on the pivot lever 6 which is disposed closer towards the interior of the vehicle, in the area of the crank of the pivot lever 6. The control lever 8 is positively guided, among other things by the guide 9 and the housing 5, such that the folding-out of the folding step 3 is blocked in the positions of the step 2 shown in FIGS. 1 and 2. This blockade is not released when the step 2 is extended further by motor-actuation into the position shown in FIG. 2, and the folding step 3 remains in the folded-in position abutting the step 2. The extended position of the step 2 is shown in FIG. 3. In this position, the step 2 is locked by locking means that are not shown. In this extended position of the step 2, the blockade of the folding step 3 is released, and the folding step 3 is folded into the folded-out position shown in FIG. 5 via the partially folded-out position shown in FIG. 4 by motor-actuated movement of the control lever 8 along its positive guide 9. The first and second areas that can be stepped upon are thus arranged parallel and offset in the manner of a staircase.

Figure 5:
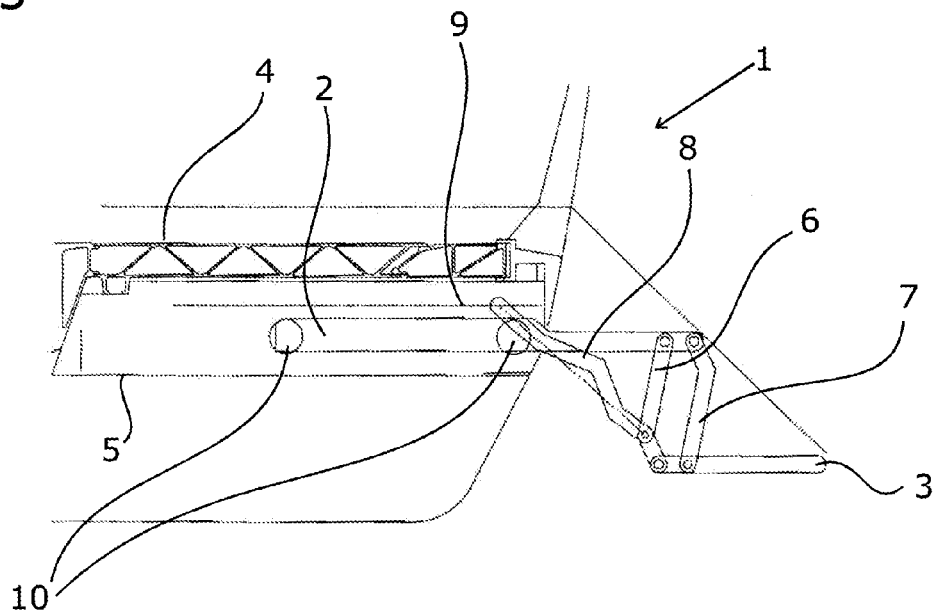
FIG. 5 shows a lateral schematic cross-sectional view of the first embodiment of the boarding and deboarding apparatus according to the invention, wherein the step is in the extended position, and the folding step is in the folded-out position.

The folding step 3 is folded into the folded-in position, and the step 2 retracted, in accordance with the sequence of Figures from FIG. 5 via 4, 3, 2 to FIG. 1, and via the respective depicted positions. Thus, the folding step 3 can be prevented from folding out, and the limitation of the traveling distance of the step 2 can be averted.

Figure 6:
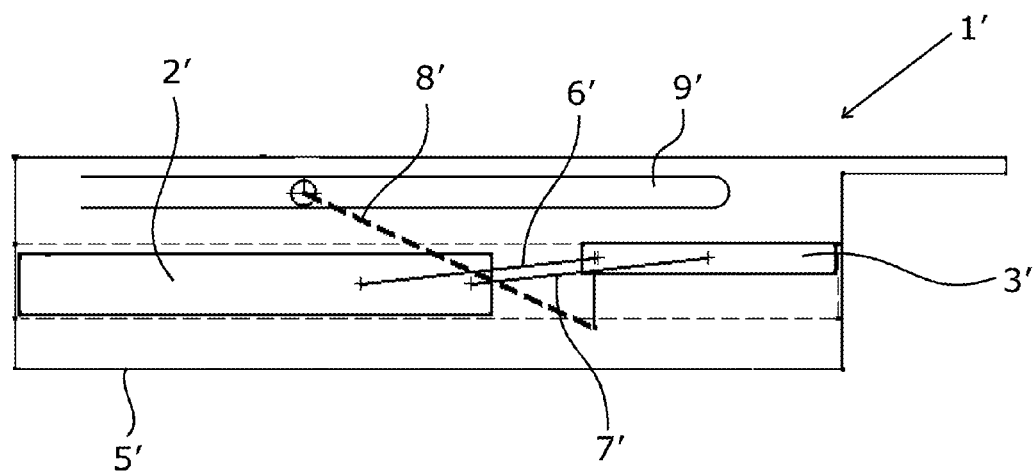
FIG. 6 shows a lateral schematic cross-sectional view of a second embodiment of the boarding and deboarding apparatus according to the invention, wherein the step is in the retracted position.
Figure 7:
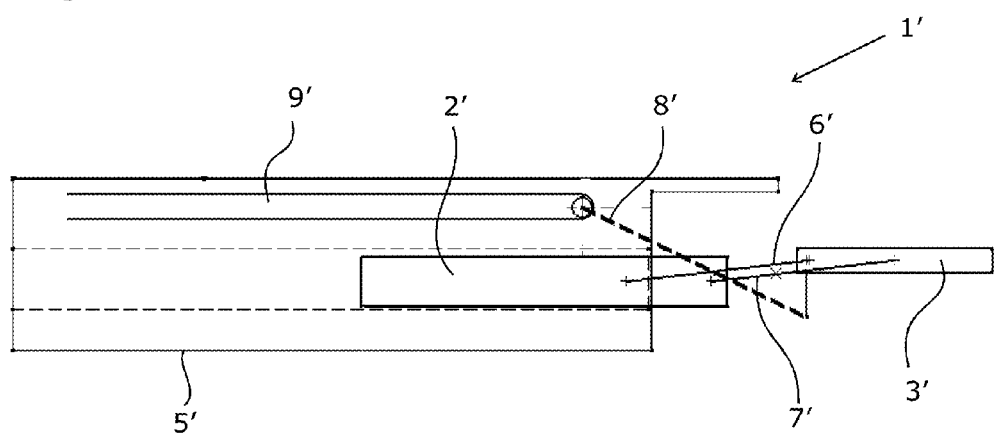
FIG. 7 shows a lateral schematic cross-sectional view of the second embodiment of the boarding and deboarding apparatus according to the invention, wherein the step is between the retracted and the extended position and the folding out of the folding step is not blocked, but did not take place yet.
Figure 8:
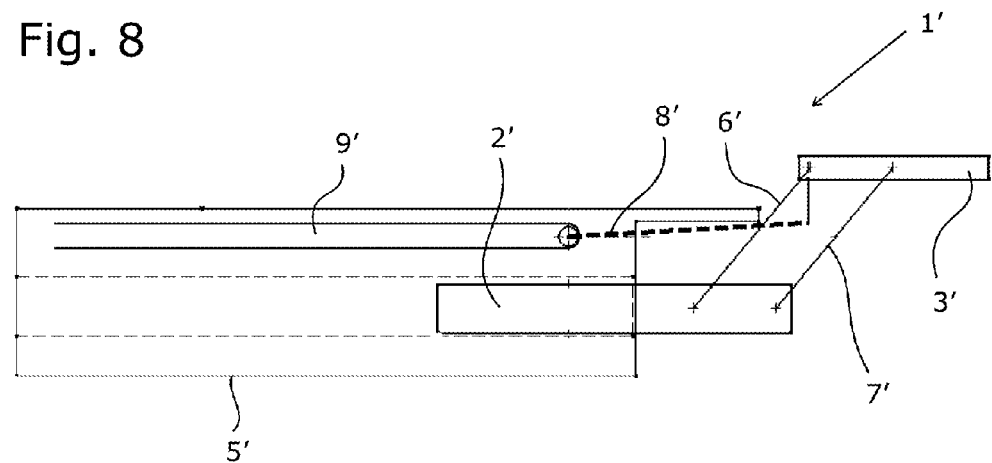
FIG. 8 shows a lateral schematic cross-sectional view of the second embodiment of the boarding and deboarding apparatus according to the invention, wherein the step is in the extended position, and the folding step is in the folded-out position.

A second embodiment of the boarding and deboarding apparatus according to the invention is shown in FIGS. 6 to 8. The boarding and deboarding apparatus 1' also comprises a sliding step, i.e. a linearly guided step 2'. This step 2' is laterally mounted so as to be movable back and forth by means of linearly extending guides that are not shown. These guides are attached in a housing 5', which in turn is attached to a vehicle frame (not shown) of a passenger transport vehicle. The movement back and forth of the step 2' is caused by a drive that is not shown, for example a so-called spindle drive. The step 2' defines a first area that can be stepped upon. A folding step 3' is pivotably mounted on the step 2', which folding step is shown in FIG. 6 in the folded-in state, i.e. pivoted towards the step 2', and which defines a second area that can be stepped upon. The pivotable mounting is achieved by means of the pivot levers 6' and 7', which are designed and arranged such that a lever parallelogram is formed and a parallel orientation of the first and second areas that can be stepped upon is maintained when the folding step 3' is pivoted. In this embodiment, the two pivot levers are straight, but may also be cranked. A control lever 8' is hinged on the pivot lever 6' which is disposed closer towards the interior of the vehicle. The control lever 8' is positively guided, among other things by the guide 9' and the housing 5'. When the step 2' is extended from the retracted position shown in FIG. 6 into the intermediate position shown in FIG. 7, the folding step 3' remains in the folded-in position abutting the step 2'. In FIG. 7, the step 2' reaches an intermediate position in which the control lever 8' hits a stop of the positive guide 9'. In this position, the positive guide 9' prevents further longitudinal movement of the control lever 8' in the direction of extension of the step 2'. By further movement of the step 2', the folding step 3' is folded out by the control lever 8' into the folded-out position shown in FIG. 8. At the same time, the step 2' reaches the extended position and is locked in this position by locking means that are not shown.

The first and second areas that can be stepped upon are thus arranged parallel and offset in the manner of a staircase. The folding step 3' is folded into the folded-in position, and the step 2' retracted, in accordance with the sequence of Figures from FIG. 8 via 7 to FIG. 6, and via the respective depicted positions. Thus, the folding step 3' can be prevented from folding out, and the limitation of the traveling distance of the step 2 can be averted.

The invention claimed is:

1. Boarding and deboarding apparatus for a vehicle, comprising:
    a sliding step that is linearly movable between a retracted and extended position via actuation by a motorized drive, which at least in a partially extended position defines a first area that can be stepped upon,
    lateral guides of the sliding step for attachment to a vehicle,
    a folding step which is mounted on the sliding step so as to be pivotable between a folded-in and folded-out position and which in a folded-out position defines a second area that can be stepped upon which is parallel to the first area, and
    blocking means which prevent the folding step from pivoting between the retracted position and an intermediate position of the sliding step, and which release the pivoting of the folding step, at the latest, when the extended position of the sliding step has been reached,
    wherein said blocking means includes a housing that houses a control lever and a positive guide, said control lever being mounted on said folding step and being releasable from said blocking means upon reaching said extended position of said sliding step,
    wherein release of said control lever allows said control lever to pivot said folding step into said folded-out position via actuation of said control lever by said motorized drive along the positive guide in said housing.

2. Boarding and deboarding apparatus according to claim 1, further comprising a step locking lever configured to lock said sliding step in said extended position.

3. Boarding and deboarding apparatus according to claim 2, wherein the step locking lever is configured such that the sliding step is released from being locked as the folding step is being pivoted into the folded-in position.

4. Boarding and deboarding apparatus according to claim 1, wherein the folding step is pivotably mounted on the sliding step by means of pivot levers forming a lever parallelogram.

5. Boarding and deboarding apparatus according to claim 1, wherein, when the folding step is in the folded-in position, the sliding step and the folding step are arranged at a clear width of 110 mm in a vertical direction relative to the areas that can be stepped upon.

6. Boarding and deboarding apparatus according to claim 1, wherein the second area of the folding step is positionable to be stepped upon, and horizontally offset relative to the first area of the sliding step that can be stepped upon.

7. Boarding and deboarding apparatus according to claim 1, wherein a control device is provided which is designed such that the movement of the sliding step and the folding of the folding step is carried out in sequence, and the latter is carried out optionally.

8. Passenger transport vehicle, comprising a boarding and deboarding apparatus according to claim 1.

* * * * *